United States Patent
Guo et al.

(10) Patent No.: US 12,248,934 B2
(45) Date of Patent: Mar. 11, 2025

(54) RESOURCE TRANSFER DATA MANAGEMENT METHOD AND APPARATUS, AND STORAGE MEDIUM

(71) Applicant: Tencent Technology (Shenzhen) Company Limited, Shenzhen (CN)

(72) Inventors: Rui Guo, Shenzhen (CN); Maocai Li, Shenzhen (CN); Zongyou Wang, Shenzhen (CN); Haitao Tu, Shenzhen (CN); Li Kong, Shenzhen (CN); Kaiban Zhou, Shenzhen (CN); Changqing Yang, Shenzhen (CN); Nan Wang, Shenzhen (CN); Yong Ding, Shenzhen (CN); Yifang Shi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 914 days.

(21) Appl. No.: 17/089,462

(22) Filed: Nov. 4, 2020

(65) Prior Publication Data

US 2021/0049596 A1 Feb. 18, 2021

Related U.S. Application Data

(63) Continuation of application No. PCT/CN2019/098540, filed on Jul. 31, 2019.

(30) Foreign Application Priority Data

Aug. 1, 2018 (CN) .......................... 201810861049.4

(51) Int. Cl.
*G06Q 20/38* (2012.01)
*G06Q 10/10* (2023.01)
(Continued)

(52) U.S. Cl.
CPC .......... *G06Q 20/389* (2013.01); *G06Q 10/10* (2013.01); *G06Q 20/3825* (2013.01);
(Continued)

(58) Field of Classification Search
None
See application file for complete search history.

(56) References Cited

U.S. PATENT DOCUMENTS 11,315,115 B2 * 4/2022 Zhou ..................... G06Q 20/389
11,321,753 B2 * 5/2022 Rossi ..................... G06Q 20/06
(Continued)

FOREIGN PATENT DOCUMENTS

| AU | 2018271863 A1 * 12/2019 | ............. G01J 3/443 |
| CA | 2961828 A1 * 9/2018 | ............. G06Q 20/10 |

(Continued)

OTHER PUBLICATIONS

N. Bozic, G. Pujolle and S. Secci, "Securing virtual machine orchestration with blockchains," 2017 1st Cyber Security in Networking Conference. https://ieeexplore.ieee.org/document/8242003?source=IQplus (Year: 2017).*

(Continued)

*Primary Examiner* — El Mehdi Oussir
(74) *Attorney, Agent, or Firm* — Crowell & Moring LLP

(57) ABSTRACT

Embodiments of this disclosure disclose a resource transfer data management method and apparatus, and a storage medium, which belong to the field of Internet technologies. The method includes: receiving transaction data transmitted by a first server, wherein the transaction data is obtained by the first server by signing resource transfer data according to a private key of the first server; verifying the transaction data according to a public key of the first server; and generating a second block according to the transaction data and a feature value of a first block in a blockchain when the (Continued)

verification succeeds, and adding the second block as a next block of the first block to the blockchain.

16 Claims, 6 Drawing Sheets

(51) Int. Cl.
*G06Q 20/40* (2012.01)
*G06Q 40/04* (2012.01)
*G06Q 40/02* (2023.01)
*H04L 9/32* (2006.01)

(52) U.S. Cl.
CPC ....... *G06Q 20/3829* (2013.01); *G06Q 20/401* (2013.01); *G06Q 20/405* (2013.01); *G06Q 40/04* (2013.01); *G06Q 40/02* (2013.01); *G06Q 2220/00* (2013.01); *H04L 9/3247* (2013.01)

(56) References Cited

U.S. PATENT DOCUMENTS

| | | | | |
|---|---|---|---|---|
| 11,361,316 | B2 * | 6/2022 | Collin | H04L 9/3239 |
| 11,468,046 | B2 * | 10/2022 | Conley | G06F 16/2379 |
| 11,645,649 | B2 * | 5/2023 | Guo | H04L 9/3239 705/65 |
| 12,067,539 | B2 * | 8/2024 | Mallik | G06Q 20/3829 |
| 2017/0005804 | A1 | 1/2017 | Zinder | |
| 2018/0117446 | A1 * | 5/2018 | Tran | G06F 1/163 |
| 2018/0276666 | A1 * | 9/2018 | Haldenby | H04L 9/3268 |
| 2019/0057454 | A1 * | 2/2019 | Komenda | H04L 9/3242 |
| 2019/0109713 | A1 * | 4/2019 | Clark | G06F 16/182 |
| 2019/0164153 | A1 * | 5/2019 | Agrawal | H04L 9/0637 |
| 2019/0370250 | A1 * | 12/2019 | Tipton | H04L 9/321 |
| 2019/0392164 | A1 * | 12/2019 | Dutta | H04L 9/0825 |
| 2020/0005284 | A1 * | 1/2020 | Vijayan | H04L 9/3247 |
| 2020/0019680 | A1 * | 1/2020 | Frederick | G06F 21/31 |
| 2020/0045019 | A1 * | 2/2020 | Huang | H04L 63/062 |
| 2020/0134206 | A1 * | 4/2020 | Thekadath | G06F 21/602 |
| 2020/0302433 | A1 * | 9/2020 | Green | G06Q 20/40 |
| 2021/0073212 | A1 * | 3/2021 | Conley | H04L 9/3213 |
| 2021/0201328 | A1 * | 7/2021 | Gunther | H04L 9/3073 |
| 2023/0080371 | A1 * | 3/2023 | Leise | H04L 9/0637 705/4 |

FOREIGN PATENT DOCUMENTS

| | | | | |
|---|---|---|---|---|
| CN | 105976232 | A | | 9/2016 |
| CN | 106327173 | A | | 1/2017 |
| CN | 107220820 | A | | 9/2017 |
| CN | 107240001 | A | | 10/2017 |
| CN | 107395343 | A | | 11/2017 |
| CN | 107729383 | A | | 2/2018 |
| CN | 108062671 | A | | 5/2018 |
| CN | 108320228 | A | | 7/2018 |
| CN | 109102299 | A | | 12/2018 |
| CN | 106408299 | B | * | 4/2020 ........... G06Q 20/382 |
| CN | 107341702 | B | * | 6/2020 ........... G06F 21/602 |
| CN | 107911216 | B | * | 7/2020 ........... G06F 21/602 |
| CN | 108009917 | B | * | 12/2021 ........... G06F 21/602 |
| EP | 3396575 | B1 | * | 11/2019 ........... G06F 21/105 |
| JP | 6362805 | B1 | | 7/2018 |
| JP | 2018-521437 | A | | 8/2018 |
| KR | 101835519 | B1 | * | 12/2016 |
| KR | 20180079806 | A | * | 1/2017 |
| KR | 101877345 | B1 | * | 4/2017 |
| KR | 20190130377 | A | * | 5/2018 |
| KR | 101962289 | B1 | * | 12/2018 |

OTHER PUBLICATIONS

A. A. Monrat, O. Schelén and K. Andersson, "A Survey of Blockchain From the Perspectives of Applications, Challenges, and Opportunities," in IEEE Access, vol. 7, p. 117134-117151, 2019. https://ieeexplore.ieee.org/document/8805074?source=IQplus (Year: 2019).*
D. Vujičić, D. Jagodić and S. Ranđić, "Blockchain technology, bitcoin, and Ethereum: A brief overview," 2018 17th International Symposium Infoteh-Jahorina (INFOTEH), East Sarajevo, Bosnia and Herzegovina. https://ieeexplore.ieee.org/document/8345547?source=IQplus (Year: 2018).*
V. Vallois and F. A. Guenane, "Bitcoin transaction: From the creation to validation, a protocol overview," 2017 1st Cyber Security in Networking Conference (CSNet), Rio de Janeiro, Brazil, 2017. https://ieeexplore.ieee.org/document/8241988?source=IQplus (Year: 2017).*
Q. Dai, K. Xv, S. Guo, L. Dai and Z. Zhou, "A Private Data Protection Scheme Based on Blockchain under Pipeline Model," 2018 1st IEEE International Conference on Hot Information-Centric Networking (HotICN), Shenzhen, China, 2018. https://ieeexplore.ieee.org/document/8605987?source=IQplus (Year: 2018).*
Office Action with English Translation of Concise Explanation of Relevance for Chinese Patent Application No. 201810861049.4 dated Mar. 3, 2021; 12 pages.
Office Action with English Translation of Concise Explanation of Relevance for Chinese Patent Application No. CN201810861049.4 dated Apr. 1, 2021; 9 pages.
Japanese Office Action with English Translation for Japanese Patent Application No. 2020-563752 dated Feb. 7, 2022, 5 pages.
Daniel Drescher, Thorough Understanding of Blockchain, First Edition, Japan, Impress Corporation, Jul. 1, 2018, pp. 76-77, 132-134 (Publication showing well-known technology).
International Search Report and Written Opinion with English Translation for International Application No. PCT/CN2019/098540 dated Oct. 30, 2019; 12 pages.

* cited by examiner

RESOURCE TRANSFER DATA MANAGEMENT METHOD AND APPARATUS, AND STORAGE MEDIUM

RELATED APPLICATION

This application is a continuation application of the International PCT Application No. PCT/CN2019/098540, filed with the China National Intellectual Property Administration, PRC on Jul. 31, 2019 which claims priority to Chinese Patent Application No. 201810861049.4, entitled "RESOURCE TRANSFER DATA MANAGEMENT METHOD AND APPARATUS, AND STORAGE MEDIUM" and filed with the China National Intellectual Property Administration, PRC on Aug. 1, 2018, which are incorporated herein by reference in their entireties.

FIELD OF THE TECHNOLOGY

Embodiments of this disclosure relate to the field of Internet technologies, and in particular, to a method, an apparatus, and a storage medium for resource transfer data management.

BACKGROUND OF THE DISCLOSURE

People in daily life need to perform various types of resource transfer operations, such as paying a water bill, paying an electric bill, and paying a credit card. With the rapid development and wide application of Internet technologies, a third-party application helping perform resource transfer operations is introduced. The third-party application may be delegated by a user to complete the resource transfer operations conveniently and quickly, and brings much convenience to a user's life.

During a process of implementing embodiments of this disclosure, the inventors find that at least the following problems exist in the related art: The foregoing resource transfer operations are performed by a server, and resource transfer data that is centrally stored in the server may be easily lost or tampered with and has poor security. Once the server maliciously transfers resources of a user to other resource accounts, an un-traceable resource loss may be caused to the user.

SUMMARY

A resource transfer data management method and apparatus, and a storage medium are provided according to embodiments of this disclosure.

According to one aspect, a resource transfer data management method is provided, performed by a data management system, the data management system including a plurality of blockchain nodes, and the method including:
receiving transaction data transmitted by a first server, the transaction data being obtained by the first server by signing resource transfer data according to a private key of the first server in a case that the first server determines that the resource transfer data meets a delegating resource transfer condition, to obtain the transaction data, the resource transfer data including a transferor identifier, a transferee identifier, and a quantity of resources transferred from a transferor to a transferee;
verifying the transaction data according to a public key of the first server; and
generating a second block according to the transaction data and a feature value of a first block in a blockchain if the verification succeeds, and adding the second block to the blockchain as a next block of the first block, the second block being used for storing the transaction data.

According to one aspect, a resource transfer data management method is provided, performed by a first server, the method including:
obtaining resource transfer data, the resource transfer data including a transferor identifier, a transferee identifier, and a quantity of resources transferred from a transferor to a transferee;
signing the resource transfer data according to a private key of the first server in response to determining that the resource transfer data meets a delegating resource transfer condition, to obtain transaction data;
transmitting the transaction data to a data management system; and
the data management system including a plurality of blockchain nodes, and the data management system being configured to: verify the transaction data according to a public key of the first server, generate a second block according to the transaction data and a feature value of a first block in a case that the verification succeeds, and add the second block to a blockchain, to enable the second block in the blockchain to be a next block of the first block, the second block being used for storing the transaction data.

According to one aspect, a resource transfer data management apparatus is provided, applied to a data management system, the data management system including a plurality of blockchain nodes, and the apparatus including:
a receiving module, configured to: receive transaction data transmitted by a first server, the transaction data being obtained by the first server by signing resource transfer data according to a private key of the first server in a case that the first server determines that the resource transfer data meets a delegating resource transfer condition, to obtain the transaction data, the resource transfer data including a transferor identifier, a transferee identifier, and a quantity of resources transferred from a transferor to a transferee;
a verification module, configured to verify the transaction data according to a public key of the first server; and
a generating module, configured to: generate a second block according to the transaction data and a feature value of a first block in a case that the verification succeeds, and add the second block to a blockchain, to enable the second block in the blockchain to be a next block of the first block, the second block being used for storing the transaction data.

According to one aspect, a resource transfer data management apparatus is provided, applied to a first server, the apparatus including:
an obtaining module, configured to obtain resource transfer data, the resource transfer data including a transferor identifier, a transferee identifier, and a quantity of resources transferred from a transferor to a transferee;
a signing module, configured to sign the resource transfer data according to a private key of the first server in response to determining that the resource transfer data meets a delegating resource transfer condition, to obtain transaction data;
a transmission module, configured to transmit the transaction data to a data management system; and the data management system including a plurality of blockchain nodes, and the data management system being configured to: verify the transaction data according to a public key of the first server, generate a second block according to the transaction data and a feature value of a first block in a case that the verification succeeds, and add the second block to a blockchain, to enable the second block in the blockchain to be a next block of the first block, the second block being used for storing the transaction data.

According to one aspect, a resource transfer data management apparatus is provided, including a memory and a processor, the memory storing computer-readable instructions, the computer-readable instructions, when executed by the processor, causing the processor to perform the steps of the resource transfer data management method in the foregoing embodiments.

According to an aspect, one or more non-transitory storage media storing computer-readable instructions are provided, the computer-readable instructions, when executed by one or more processors, causing the one or more processors to perform the steps of the resource transfer data management method in the foregoing embodiments.

Details of one or more embodiments of this disclosure are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from the accompanying drawings without creative efforts.

DESCRIPTION OF EMBODIMENTS

Figure 1:
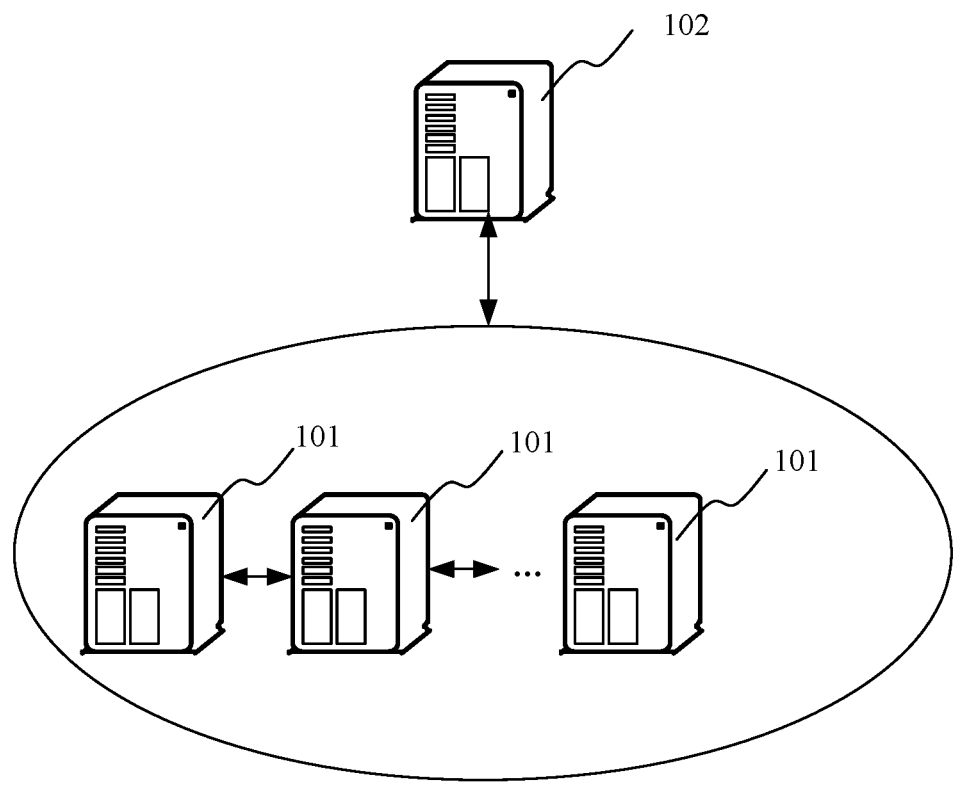
FIG. 1 is a schematic diagram of an implementation environment according to an embodiment of this disclosure.

To make objectives, technical solutions, and advantages of the embodiments of this disclosure clearer, the following further describes in detail implementations of this application with reference to the accompanying drawings.

Before embodiments of this disclosure are described in detail, concepts related to the embodiments of this disclosure are first described as follows:

1. Blockchain

In the narrow sense, a blockchain is a chain data structure formed by combining data blocks according to a time sequence in a sequential connection manner, and a tamper-proof and unforgeable distributed ledger ensured by a cryptography manner.

In the broad sense, the blockchain technology is a distributed infrastructure and computing method that uses a blockchain data structure to verify and store data, uses a distributed node consensus algorithm to generate and update data, uses a method of cryptology to ensure the security of data transmission and access, and uses a smart contract to manipulate data.

A plurality of blockchain nodes in a blockchain network may be configured with the same blockchain, and data is stored in the blockchain, to ensure that the data is stored synchronously.

2. Transferor, Intermediary, and Transferee

The transferor is a user who needs to transfer resources to a charging entity, for example, an individual user who needs to pay an electricity bill, or an individual user who needs to pay a credit card. The resources may include any types of currencies.

The transferee is a charging entity that needs to collect resources from user, for example, an electric power company that needs to charge a user's electricity bill, or a bank that needs to collect a user's credit card payment.

The intermediary is a medium between the transferor and the transferee, and may transfer resources of the transferor to the transferee. The intermediary may be referred to as a third-party application and may act as a delegator of the transferor.

3. Resource Transfer Data and Transaction Data

The resource transfer data includes a transferor identifier, a transferee identifier and a resource quantity, and the resource quantity may represent a quantity of resources transferred from the transferor to the transferee.

The transaction data is obtained by signing the resource transfer data according to a private key of a server that initiates a transaction, and the private key may represent an identity of the server. Alternatively, the transaction data may be further obtained by signing the resource transfer data according to a private key of the transferor identifier that initiates a transaction, the private key may represent an identity of the transferor identifier, and a party transferring the resources may be determined according to the transaction data.

4. Active Payment and Passive Payment

The active payment means that a user actively transfers resources in a resource account to another resource account, and the operation of transferring the resources is initiated by the user.

The passive payment means that an intermediary is delegated by a user to transfer the resources in the resource account to another resource account, and the operation of transferring the resources is not actively performed by the user, but is performed by the intermediary.

In one embodiment of this disclosure, the user that needs to transfer the resources serves as a transferor, a user that needs to collect the user resources serves as a transferee, and a third-party application may serve as an intermediary between the transferor and the transferee. In this way, the transferor may access a server of the third-party application, create a resource account on the server, and store resources in the resource account. The transferee may alternatively access the server, create a resource account on the server, and collect, through the resource account, resources transferred from each transferor. When needing to collect the resources from the transferors, the transferee determines resource transfer data. The resource transfer data includes a quantity of resources that need to be transferred from the transferors to the transferee. The server deducts a corresponding quantity of resources from resource accounts of the transferors according to the resource transfer data, and adds the corresponding quantity of resources to the resource account of the transferee, to complete the resource transfer operation on behalf of the transferors. In addition, the server further stores resource transfer data, and records, by using the resource transfer data, the resources transfer process. Because the resource transfer operation is performed by the server, the resource transfer data centrally stored in the server is easily lost or tampered with, and has poor security. Once the server maliciously transfers resources of a user to another resource account, a resource loss is caused to the user and the transfer process may be un-traceable.

FIG. 1 is a schematic diagram of an implementation environment according to an embodiment of this disclosure. As shown in FIG. 1, the implementation environment includes a data management system. The data management system may provide functions for transferring resources on behalf of a transferor, storing the resource transfer data, querying the resource transfer data, and the like.

Users of the data management system may include a transferor, an intermediary, and a transferee. After the transferor and the intermediary reach an agreement that the intermediary transfer resources on behalf of the transferor, and after the transferor determines a quantity of resources that need to be transferred to the transferee and generates corresponding resource transfer data, the intermediary initiates a transaction for the resource transfer, and stores the resource transfer data to the blockchain.

Alternatively, when the transferor actively transfers resources, the transferor determines a quantity of resources that need to be transferred to the transferee, and after generating corresponding resource transfer data, the transferor initiates a transaction for the resource transfer, and stores the resource transfer data to the blockchain.

In the subsequent process, the transferor, the intermediary and the transferee may all query the resource transfer data in the blockchain, so that the security and traceability of the resource transfer data are ensured.

The data management system includes a plurality of blockchain nodes 101. The plurality of blockchain nodes 101 form a blockchain network, and each blockchain node 101 may be configured with the same blockchain used for storing the transaction data. Each block may be used for storing data for one transaction. A blockchain includes a plurality of blocks. The blocks on the blockchain may be stored according to a time sequence, and new blocks are added as the blockchain continually grows.

In a possible implementation, the data management system may further include a management server 102. The management server 102 may be used as an application layer of a front end of the data management system. The management server 102 may not only implement functions such as user login verification, displaying interface, and the like, but may also manage the transaction data stored on the blockchain of the plurality of blockchain nodes 101.

In this way, when the data management system interacts with a user layer, the management server 102 may serve as a medium between the user layer and the blockchain network, manage data on the blockchain network according to a request initiated by the user layer, and feed the data back to the user layer.

Figure 2:
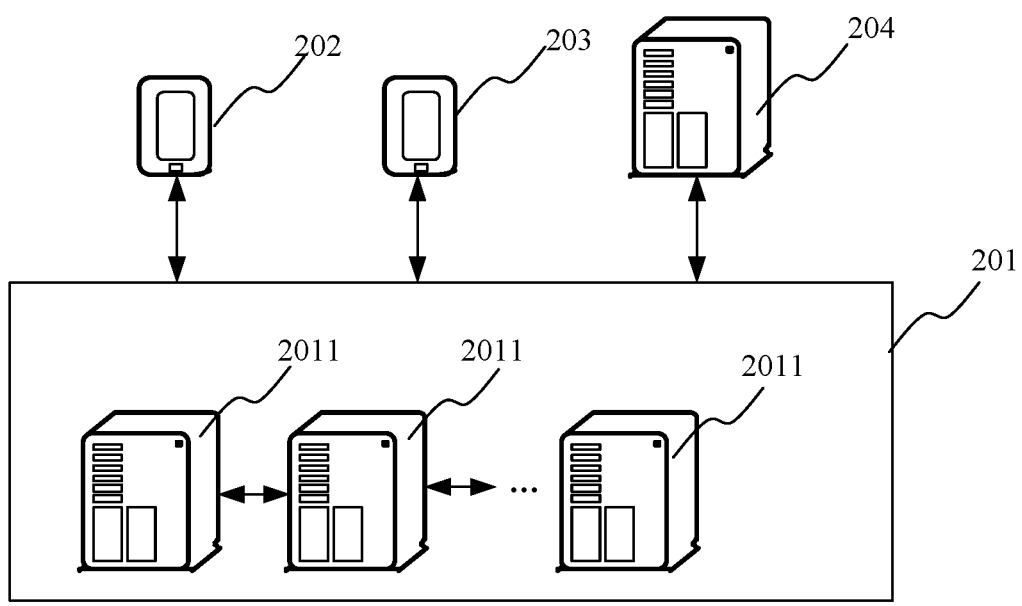
FIG. 2 is a schematic diagram of an implementation environment according to an embodiment of this disclosure.

Based on the implementation environment shown in the foregoing embodiments, an embodiment of this disclosure further provides another implementation environment. FIG. 2 is a schematic diagram of another implementation environment according to an embodiment of this disclosure. Referring to FIG. 2, the implementation environment includes a data management system 201, a first terminal 202, a second terminal 203, and a first server 204. The data management system 201 includes a plurality of blockchain nodes 2011. The first terminal 202, the second terminal 203, and the first server 204 may all be connected to the data management system 201 through a network.

The first terminal 202 may be a terminal configured for the transferor. Using the first terminal 202, the transferor may view, through a management interface provided by the data management system 201, resources transferred by himself/herself, or resources transferred by the intermediary, and may further initiate a resource transfer request through the management interface, to transfer the resources to the transferee.

Alternatively, using the first terminal 202, the transferor may further access the first server 204 configured by the intermediary, and view, through an application interface provided by the first server 204, resources transferred by the first server on behalf of the transferor, and may further initiate a delegating resource transfer request through the application interface, to request the first server to transfer the resources to the transferee on behalf of the transferor.

The second terminal 203 may be a terminal configured for the transferee. Using the second terminal 203, the transferee may view, through the management interface provided by the data management system 201, resources transferred by the intermediary on behalf of the transferor, or resources actively transferred by the transferor. Alternatively, the transferee may use the second terminal 203 to further access the first server 204 configured by the intermediary, and manage, through the application interface provided by the first server 204, users who have activated a delegating resource transfer function, and transmit resource transfer data of the users to the first server 204, to trigger the first server to perform the resource transfer operation according to the resource transfer data.

The transferor may be a specific individual user, or may be an enterprise user, a community user, a group user, or the like. The transferee may be a specific individual user, or may be an organization that collects resources, such as a bank issuing credit cards, or an electric power company.

The first server 204 may serve as a server configured by the intermediary, and may perform the resource transfer operation on behalf of the transferor. The first server 204 may interact with the data management system 201, to manage the resource transfer data stored on the blockchain.

In a possible implementation, each of the first terminal 202 and the second terminal 203 may install an application client associated with the first server 204, and interacts with the first server 204 through the application client, thereby activating the delegating resource transfer function. In addition, each of the first terminal 202 and the second terminal 203 may install an application client associated with the data management system 201, and interacts with the data management system 201 through the application client, thereby implementing the function of managing the resource transfer data on the blockchain.

In one embodiment of this disclosure, after the user activates the delegating resource transfer function in the server configured by the intermediary, when the user serving as the transferor needs to transfer the resources to the transferee, the server may transfer the resources on behalf of the transferor. However, the resource transfer operation is actively performed by the server, and is not confirmed by the user, and the resource transfer data centrally stored in the server is easily lost or tampered with, and has poor security. Once the server maliciously transfers the resources of the user to another resource account, the resource transfer data may not be traceable, the server may not be held accountable for a malicious transfer, and the user may not be compensated for the loss, that is, irrevocable resource loss is caused to the user.

For example, in a passive payment scenario, for example, in a service such as water and electricity bill entrusted charging, an automatic investment plan, or telephone bill entrusted charging, after the user signs a payment agreement with the third-party application (i.e., the intermediary), the third-party application processes the services for the user, for example, withholds fees for the user. In addition, the third-party application managing a user account has a complete permission on the user account, and may perform malicious deduction and destruct a deduction record, and consequently, an account risk is increased, and the user suffers a property loss. On the other hand, whether costs in the account are used by user or the third-party application cannot be distinguished. As such, a dispute may be caused, and accountability may not be pursued.

The embodiments of this disclosure provide a blockchain-based data management system. When the first server of the intermediary performs the resource transfer operation on behalf of the user, the first server takes advantage of the decentralized, open, transparent, and tamper-proof features of the blockchain, to sign the resource transfer data according to a private key of the intermediary to obtain transaction data, and stores the transaction data in the blockchain, so that the transaction data may be prevented from being lost or tampered with, thereby ensuring the security of the transaction data, and the identity of the intermediary may be further identified by using the private key of the intermediary, thereby ensuring the traceability of the transaction data. In case the server maliciously transfers the resources of the user to another resource account, the process of transferring the resources may be traced back according to the transaction data, so the intermediary may be held accountable in a dispute to compensate for the resource loss of the transferor. The data management system may be applied to a plurality of passive payment scenarios, such as water, electricity, gas bill entrusted charging, an automatic investment plan, automatic credit card payment, and telephone bill entrusted charging. In the passive payment scenario, passive payment may be performed based on a blockchain system, so each payment record and an operator may be clearly recorded, data may not be tampered with, and higher security is achieved.

In addition, when the transferor performs the resource transfer operation, the transferor uses the features of decentralization, openness, transparency and tamper resistance of the blockchain, to sign the resource transfer data according to the private key of the transferor, and stores the transaction data in the blockchain, so that the transaction data can be prevented from being lost or tampered with, thereby ensuring the security of the transaction data, and the identity of the transferor may be further identified by using the private key of the transferor, thereby ensuring the traceability of the transaction data. In addition, the transferor, the transferee, the intermediary, and a supervisory department may conveniently query the transaction data in the blockchain, knows details that the intermediary transfers the resources on behalf of the transferor, and behaviors of the intermediary are effectively restricted, thereby reducing the risk of absconding with money by the intermediary.

A registration procedure of the data management system is first described below:

A user of the data management system may be an individual user, an enterprise user, a community user, a group user, or the like. The user registers a user identifier on the management server, and logs in to the data management system based on the user identifier, to manage the resource transfer data by using the data management system. The user identifier is used for representing a user identity, and may be a user name, a user account, or the like.

In addition, for a user who succeeds in registration, the data management system may generate a public key and a corresponding private key for the user, and deliver the private key to the user. The private key may be kept by the user, and the public key may be kept by each blockchain node. Alternatively, the user may generate a public key and a corresponding private key. The private key may be kept by the user, and the public key is uploaded to the data management system, and may be kept by each blockchain node.

Then, in the subsequent transaction process, each time the user initiates a transaction to the data management system, a signature may be performed according to the private key of the user, and the identity of the user is identified by the private key. When the blockchain node executes the transaction, the user identity needs to be first verified according to the public key of the user, and the transaction may only be executed after the verification succeeds.

Users of the data management system include the transferor, the transferee, and the intermediary. For the intermediary, to ensure the security, when a user is to be registered as the intermediary to transfer the resources on behalf of another user, the user is required to upload real identity information and relevant evidentiary materials for real-name certification. For example, the enterprise user needs to upload a certificate such as a business registration and a qualification certificate showing that resource transactions are allowed.

Figure 3:
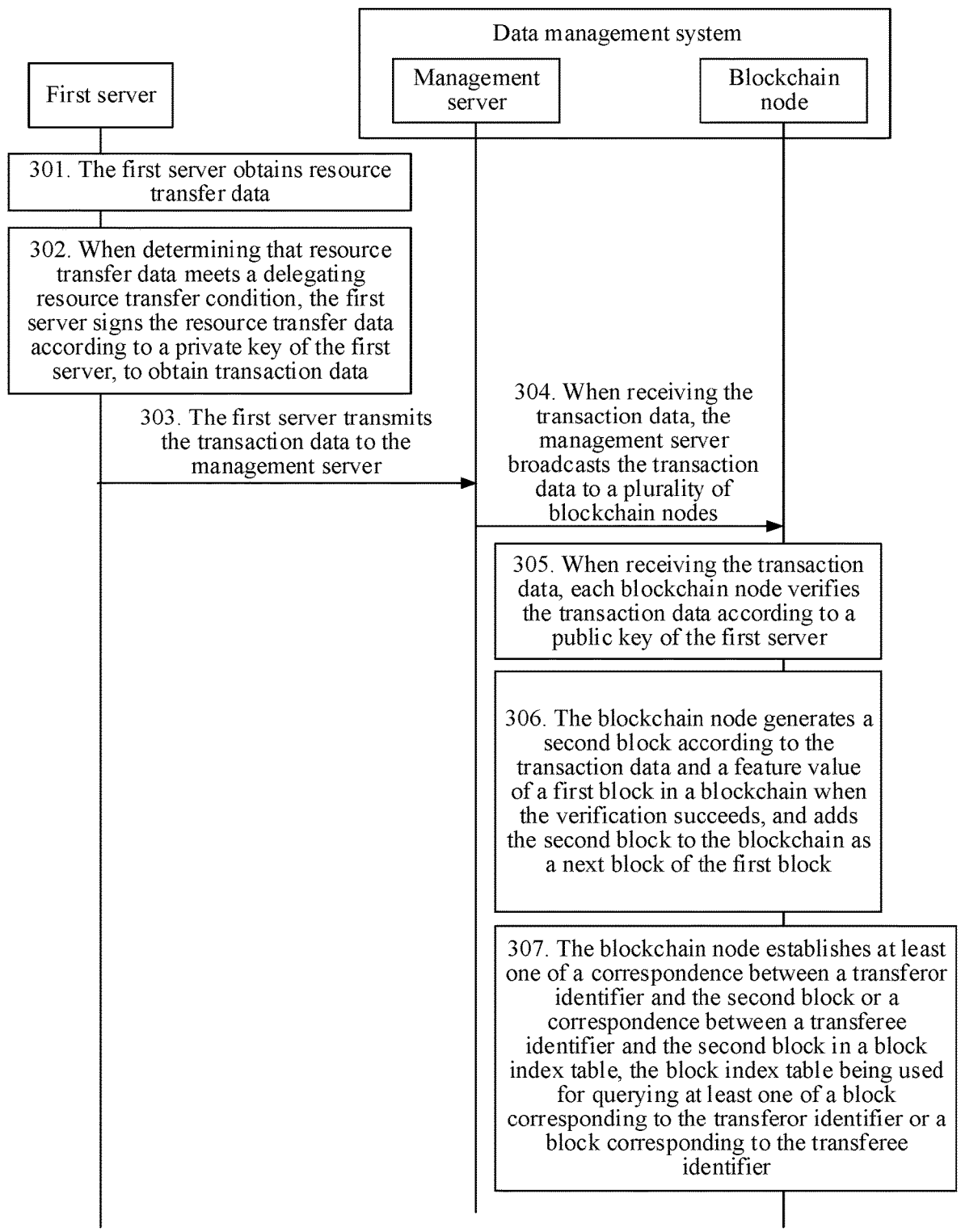
FIG. 3 is a schematic diagram of a resource transfer data management method according to an embodiment of this disclosure.

FIG. 3 is a schematic diagram of a resource transfer data management method according to an embodiment of this disclosure. The execution body of this embodiment of this disclosure is a data management system and a first server. In this embodiment of this disclosure, a process of transferring resources is described below. Referring to FIG. 3, the method includes the following steps:

301. The first server obtains resource transfer data.

The resource transfer data includes a transferor identifier, a transferee identifier and a quantity of resources to be transferred by the transferor to the transferee. The transferor identifier is used for representing the identity of the user who needs to transfer the resources, the user may be referred to as the transferor, and the transferor identifier may be at least one of a user account or a user name of the transferor. The transferee identifier is used for representing the identity of the user who needs to receive the resources, the user may be referred to as the transferee, and the transferee identifier may be at least one of a user account or a user name of the transferee.

In addition, the resource transfer data may further include at least one of a bill for the resources to be transferred, a due date, or details of the resources to be transferred For example, the resource transfer data may be shown in Table 1 below.

TABLE 1

| Payer  | Payee                      | Payment amount | Bill                       |
|--------|----------------------------|----------------|----------------------------|
| User A | Electric power company B   | 100            | Electric bill in May, 2018 |

In a possible implementation, the resource transfer data may be automatically generated by the first server according to a preset rule. The preset rule includes a generating rule of the resource transfer data, and the like. For example, if the transferor activates a monthly telephone bill entrusted charging service and determines that a telephone bill amount is 30 yuan at the beginning of each month, the first server may generate, at the beginning of each month, one piece of resource transfer data according to the service activated by the transferor. The resource transfer data includes a telephone number of the transferor, an operator who charges the telephone bill, and the telephone bill amount: 30 yuan.

In another possible implementation, a terminal or a server of the transferee may generate the resource transfer data according to requirements, and transmit the resource transfer data to the first server, and the first server receives the resource transfer data. For example, the electric power company B reads an electricity meter of the user A each month, and determines, according to the electricity meter display, an electric bill amount that the user A needs to pay, to obtain resource transfer data.

The terminal or the server of the transferee may determine, according to requirements, whether to generate the resource transfer data. Alternatively, the preset rule of the first server includes a timing for obtaining the resource transfer data, and the first server generates the resource transfer data or requests the resource transfer data from the transferee according to the timing in the preset rule. Alternatively, the transferor accesses the first server by using the terminal, and triggers a delegating resource transfer request. When receiving the delegating resource transfer request transmitted by the terminal of the transferor, the first server generates the resource transfer data or requests the resource transfer data from the transferee.

302. When determining that the resource transfer data meets a delegating resource transfer condition, the first server signs the resource transfer data according to a private key of the first server, to obtain transaction data.

The first server sets the delegating resource transfer condition. The delegating resource transfer condition is used for specifying a condition that the resource transfer data needs to meet in order to transfer the resources. The resource transfer is only allowed if the resource transfer data meets the delegating resource transfer condition, and the resource transfer cannot be performed for the resource transfer data that does not meet the delegating resource transfer condition. Therefore, after the first server obtains the resource transfer data, whether the resource transfer data meets the delegating resource transfer condition is determined, to determine whether a delegating resource transfer process may be initiated for the resource transfer data.

In a possible implementation, the process of determining whether the resource transfer data meets the delegating resource transfer condition may include at least one of 3021 to 3023 in the following:

3021. The delegating resource transfer condition includes a specified transferor identifier of which a delegating resource transfer function is activated, and it is determined that the resource transfer data meets the delegating resource transfer condition if the transferor identifier in the resource transfer data is the specified transferor identifier.

One or more users may activate the delegating resource transfer function in the first server, and the first server determines the user identifier of which the delegating resource transfer function is activated, and uses the user identifier as the specified transferor identifier. After obtaining the resource transfer data, the first server obtains the transferor identifier from the resource transfer data, and determines whether the transferor identifier is the specified transferor identifier. If the transferor identifier is the specified transferor identifier, it indicates that the delegating resource transfer function of the transferor identifier has indeed been activated, and the first server determines that the resource transfer data meets the delegating resource transfer condition.

Optionally, the first server generates a user list. The user list includes a plurality of user identifiers of which the delegating resource transfer function is activated, and the plurality of user identifiers are the specified transferor identifiers. If the transferor identifier in the resource transfer data obtained is included in the user list, it indicates that the first server is allowed to transfer the resources on behalf of the transferor.

For example, when the user A has activated the replacement resource transfer function, the first server adds the user A to the user list. If the transferor in the resource transfer data obtained by the first server is the user A, the first server is allowed to transfer the resources on behalf of the user A.

3022. The delegating resource transfer condition includes a correspondence between the specified transferor identifier of which the delegating resource transfer function is activated and a specified transferee identifier, and it is determined that the resource transfer data meets the delegating resource transfer condition if the transferor identifier in the resource transfer data corresponds to the transferee identifier.

One or more users may activate, in the first server, the function of delegating resource transfer to a specified user. The first server determines a user identifier of which the delegating resource transfer function is activated, as the specified transferor identifier, and determines a specified transferee identifier corresponding to each specified transferor identifier, to establish a correspondence between the specified transferor identifier and the specified transferee identifier in the delegating resource transfer condition. When obtaining resource transfer data, the first server obtains the transferor identifier and the transferee identifier from the resource transfer data, and determines whether the delegating resource transfer condition includes the correspondence between the transferor identifier and the transferee identifier. If the correspondence exists, it indicates that the delegating resource transfer function of the transferor identified by the transferor identifier has indeed been activated, and if the transferee identifier is an identifier to which the first server is allowed by the transferor to transfer resources to, it is determined that the resource transfer data meets the delegating resource transfer condition.

For example, when the user A has activated the delegating resource transfer function to transfer resource to the user B, the first server establishes a correspondence between the user A and the user B. If a transferor in the resource transfer data obtained by the first server indicates the user A, and the transferee indicates the user B, the first server is allowed to transfer the resources to the user B on behalf on the user A. If the transferor in the resource transfer data obtained by the first server is the user A, but the transferee is a user C, the first server may not allowed to replace the user A to transfer the resources to the user C, if there is no correspondence between user A and user C.

3023. The delegating resource transfer condition may include a maximum quantity of resources allowed to be transferred which may be set by the specified transferor, and it is determined that the resource transfer data meets the delegating resource transfer condition if the resource quantity in the resource transfer data is not greater than the maximum quantity of resources allowed to be transferred.

One or more users may activate, in the first server, the function of delegating resource transfer resources to a specified transferee. The first server determines a user identifier of which the delegating resource transfer function is activated, and uses the user identifier as the specified transferor identifier, and determines the maximum quantity of resources allowed to be transferred by each specified transferor. When obtaining resource transfer data, the first server obtains the transferor identifier and the resource quantity from the resource transfer data, and determines whether the resource quantity is greater than the maximum quantity of resources allowed to be transferred. If the resource quantity is not greater than the maximum quantity of resources allowed to be transferred, it indicates that the resources transferred do not exceed a limitation of the transferor, and the first server determines that the resource transfer data meets the delegating resource transfer condition.

For example, the user A has activated the delegating resource transfer function, and determines that the maximum quantity of resources allowed to be transferred is 1000. If the transferor in the resource transfer data obtained by the first server is the user A, and the resource quantity is 100, the first server is allowed to transfer 100 on behalf on the user A. If the transferor in the resource transfer data obtained by the first server is the user A, and the resource quantity is 5000, the transfer is not allowed.

In a specific implementation, the delegating resource transfer condition set by the first server may include any one or more of the conditions in the foregoing steps from 3021 to 3023. For example, a plurality of delegating resource transfer conditions described above may be combined to determine whether the resource transfer data meets the delegating resource transfer condition. Furthermore, other delegating resource transfer conditions, such as a maximum number of delegating resource transfer per month, a maximum frequency of delegating resource transfer, may alternatively be used.

When determining the resource transfer data meets the delegating resource transfer condition, the first server signs the resource transfer data according to the private key of the first server, to obtain transaction data. The private key is used for representing an identity of the first server, and it may be determined, by tracing back according to the transaction data, that resource transfer process is initiated by the first server.

In a possible implementation, the first server may obtain a feature value of the resource transfer data, and sign the feature value of the resource transfer data according to the private key of the first server, to obtain signature data. The resource transfer data and the signature data are used as transaction data, that is, the transaction data includes the resource transfer data and the signature data. The feature value has a one-to-one correspondence to the resource transfer data, and may be a hash value or another type of feature value of the resource transfer data.

303. The first server transmits the transaction data to the management server.

In this embodiment of this disclosure, the data management system may include a management server and a plurality of blockchain nodes. The management server may open an interface to the first server. The first server invokes the interface of the management server, and transmits the transaction data to the management server, and requests the management server to store the transaction data through the blockchain, to record the resource transfer process.

Optionally, when transmitting the transaction data to the management server, the first server may further carry an intermediary identifier of the first server. The intermediary identifier is used for identifying an identity of the intermediary, and may be a user name or a user account of the intermediary. For example, the user name may be an application name or an enterprise name.

304. When receiving the transaction data, the management server broadcasts the transaction data to the plurality of blockchain nodes.

The management server may serve as an interface between the user layer and the blockchain network. When receiving the transaction data transmitted by the first server, the management server broadcasts the transaction data to the plurality of blockchain nodes, and requests to store the transaction data in the blockchain.

In a possible implementation, the management server may broadcast the transaction data only to one or more specific blockchain nodes, instead of broadcasting the transaction data to all blockchain nodes. The specific blockchain nodes may be determined according to the smart contract of the blockchain network. When receiving the transaction data, the one or more specific blockchain nodes may also broadcast the transaction data to other blockchain nodes, so that each blockchain node may receive the transaction data.

Descriptions are made by using an example in which the data management system includes the management server in this embodiment of this disclosure. In another implementation, the data management system may not include the management server. Instead, the first server transmits the transaction data to each blockchain node, or the first server transmits the transaction data to one or more blockchain nodes in the data management system. In addition, when receiving the transaction data, the one or more blockchain nodes may also broadcast the transaction data to the other blockchain nodes, so that each blockchain node may receive the transaction data. "More" refers to at least two.

305. When receiving the transaction data, each blockchain node verifies the transaction data according to a public key of the first server.

In this embodiment of this disclosure, the plurality of blockchain nodes form a blockchain network. Each blockchain node is configured with the same blockchain. The blockchain is used for storing transaction data in blocks, and the transaction data is used for representing resource transfer transactions among users. The plurality of blockchain nodes may implement data synchronization.

Therefore, each blockchain node that receives the transaction data verifies the transaction data according to the public key of the first server, so that the identity of the first server can be verified.

Based on the foregoing possible implementations in step 302, the blockchain node obtains the resource transfer data and the signature data in the transaction data, obtains the feature value of the resource transfer data, decrypts the signature data according to the public key of the first server, to obtain the decrypted feature value, and compares the decrypted feature value with the feature value of the resource transfer data, and when the decrypted feature value matches the feature value of the resource transfer data, it may be determined that the resource transfer data is not tampered with and the identity of the first server is correct. Therefore, the verification on the transaction data succeeds.

To ensure consistency, a manner in which the blockchain node obtains a feature value of the resource transfer data is the same as a manner in which the first server obtains a feature value of the resource transfer data in the foregoing step 302.

306. The blockchain node generates a second block according to the transaction data and a feature value of a first block in a blockchain if the verification succeeds, and adds the second block to the blockchain as a next block of the first block, the second block being used for storing the transaction data.

For each blockchain node, after receiving the transaction data, the blockchain node determines the first block. In one implementation, the first block may be the end block of the blockchain (i.e., the block at the end of the blockchain). The blockchain node then generates, according to the transaction data and the feature value of the first block, the second block used for storing the transaction data, and adds the second block to the blockchain as the next block of the first block. Because the feature value of the second block is related to a feature value of a previous block, there is a connection between the adjacent blocks in the blockchain, so that tampering of any information in the blockchain may be detected by tracing back the feature value stored in the next block, to ensure security of transaction data. The feature value may be a hash value of the data in the block or another type of feature value related to the data in the block. In addition, states of the transaction data may also be stored in the second block. The states of the transaction data may be validity, invalidity, and the like.

Descriptions are made by using only one transaction as an example in this embodiment of this disclosure. In another implementation, the blockchain node may receive data for multiple transactions. In this case, the blockchain node may store data of one transaction to one block, or may store data of multiple transactions to one block, to save a storage space.

In a possible implementation, when receiving the transaction data, the blockchain node first stores the transaction data to a transaction data pool, then subsequently extracts one or more transaction data from the transaction data pool, packs the extracted transaction data according to the feature value of the first block, to obtain a second block, and then adds the second block to the blockchain. For example, the blockchain node may extract the transaction data from the transaction data pool when a quantity of transaction data in the transaction data pool reaches a predefined maximum value, or may extract the transaction data from the transaction data pool according to a specific period. The blockchain node may extract transaction data in several batches, in each batch the blockchain node may extract a predetermined quantity of transaction data from the transaction data pool, and pack the transaction data into one block. The blockchain node may also extract all transaction data in the transaction data pool all in once, and pack the transaction data into one block.

When storing the transaction data in the blockchain, the one or more blockchain nodes need to verify whether the transaction data meets the smart contract, and only when reaching an agreement on a verification result of the transaction data, the one or more blockchain nodes are allowed to store the transaction data in the blockchain. For example, when verifying that the transaction data meets the smart contract, at least one blockchain node may generate the second block.

Therefore, after extracting the transaction data, any blockchain node in the plurality of blockchain nodes first verifies whether the transaction data meets the smart contract, when it is determined that the transaction data meets the smart contract, generates a second block according to the transaction data and the feature value of the first block, and transmits the generated second block to a next blockchain node. The next blockchain node continues to verify whether the transaction data in the second block meets the smart contract, and the second block is allowed to be added to the blockchain until each of verification results of the plurality of blockchain nodes indicates that the transaction data meets the smart contract.

The plurality of blockchain nodes in the blockchain network may make the smart contract. The smart contract is used for specifying conditions that the transaction data needs to meet. When verifying whether the transaction data meets the smart contract, the plurality of blockchain nodes may verify whether a format of the transaction data is legal, whether necessary information such as the transferor identifier, the transferee identifier, and the resource quantity is missing, and whether a user initiating the transaction data has the permission, and may further verify whether the transaction data meets the foregoing delegating resource transfer condition, and the like. The smart contract may further include conditions that the verification results of the plurality of blockchain nodes need to meet, such as a minimum quantity of blockchain nodes succeeding in verification, and the like. The minimum quantity of blockchain nodes may be predefined in the system.

Optionally, after verifying whether the transaction data meets the smart contract, each blockchain node signs the verification result according to a private key of the blockchain node, and transmits the signature data to a designated blockchain nodes The designated blockchain node collects signature data transmitted by each blockchain node, decrypts the signature data according to a public key of the each blockchain node, obtains a verification result of the each blockchain node, and when determining that the collected verification results meet the smart contract, allows each blockchain node to store the second block to the blockchain.

For example, the blockchain network includes five blockchain nodes. If it is specified in the smart contract that a minimum quantity of blockchain nodes succeeding in the verification on the transaction data is three, only when three or more blockchain nodes succeed in verification on the transaction data, the transaction data is allowed to be stored in the blockchain.

The multiple transaction data are stored in the blockchain in the form of blocks. Each transaction data records a quantity of resources transferred form the transferor to the transferee, and this is equivalent to recording the resources transfer process. As such, the resource transfer between users may be determined according to the blockchain.

In a possible implementation, when generating a new block each time, each blockchain node may further update a quantity of remaining resources in resource accounts of the transferor and the transferee that perform the resource transfer this time, to collect statistics on a quantity of remaining resources of each user. As the transactions continue, the quantity of remaining resources of the user may change accordingly.

307. The blockchain node establishes at least one of a correspondence between the transferor identifier and the second block or a correspondence between the transferee identifier and the second block in a block index table, the block index table being used for querying at least one of a block corresponding to the transferor identifier or a block corresponding to the transferee identifier.

The blockchain node may further create a block index table, may store, by using the block index table, the at least one of a correspondence between any transferor identifier or any transferee identifier and a block in which the resource transfer data including the transferor identifier and the transferee identifier is located, and may query, according to the block index table, a block corresponding to any transferor identifier or a block corresponding to any transferee identifier, to obtain the stored transaction data from the block. The block index table may be used for querying blocks corresponding to all or some of the transferor identifiers, or the block index table may be used for querying blocks corresponding to all or some of the transferee identifiers. Therefore, at least one of a correspondence between all or some of the transferor identifiers and the second block, or a correspondence between all or some of the transferee identifier and the second block may be established in the block index table.

In this way, when generating the second block used for storing the transaction data, the blockchain node may establish the correspondence between at least one of the transferor identifier or the transferee identifier and the second block in the block index table, to facilitate in subsequently querying the transaction data in the block according to the block index table.

Optionally, the block index table may store a correspondence between any transferor identifier, any transferee identifier and a block height. The block height is used for indicating a position of the block corresponding to the transferor identifier and the transferee identifier in the blockchain.

For example, the block index table may be shown in Table 2 below, which indicates that resource transfer data that the user A transfers resources to the user B is located in the first block in the blockchain, and resource transfer data that the user A transfers resources to the user C is located in the second block in the blockchain.

TABLE 2

| Transferor identifier | Transferee identifier | Block height |
|---|---|---|
| User A | User B | 1 |
| User A | User C | 2 |

Step 307 is an optional step. The blockchain node may alternatively not create the block index table and instead, the blockchain node may traverse each block in the blockchain when the transaction data is queried each time, and query transaction data corresponding to any transferor identifier or transaction data corresponding to any transferee identifier.

According to the method provided in this embodiment of this disclosure, in the process that the first server of the intermediary transfers the resources on behalf of the transferor, the first server signs the resource transfer data according to the private key of the first server, to obtain the transaction data, and stores the transaction data in the blockchain. Because the next block in the blockchain is generated according to the feature value of the previous block, and an association relationship exists between the adjacent blocks, the next block has a characteristic that the data cannot be tampered with, and storing the transaction data in the blockchain may ensure the security of the resource transfer data, thereby preventing the resource transfer data from getting lost or tampered with, and facilitating subsequent management operations such as querying the resource transfer data through the blockchain. In addition, the identity of the first server is represented by using the private key of the first server, so that the traceability of the transaction data is ensured. In case the first server maliciously transfers the resources of the transferor to another resource account, the intermediary may be held accountable according to the transaction data, to compensate for a resource loss of the transferor.

In addition, only when the verification on the transaction data succeeds according to the public key of the first server, the transaction data is allowed to be stored in the blockchain, so that it is determined, according to the public key of the first server, that the identity of the first server and the transaction data are correct, the possibility of transferring resources by a malicious user and the possibility of tampering with the transaction data during transmission are avoided, and the security of the transaction data during transmission is ensured.

In addition, only when the verification on the transaction data succeeds according to the smart contract, the transaction data is allowed to be stored in the blockchain, to further ensure the security and reliability.

Figure 4:
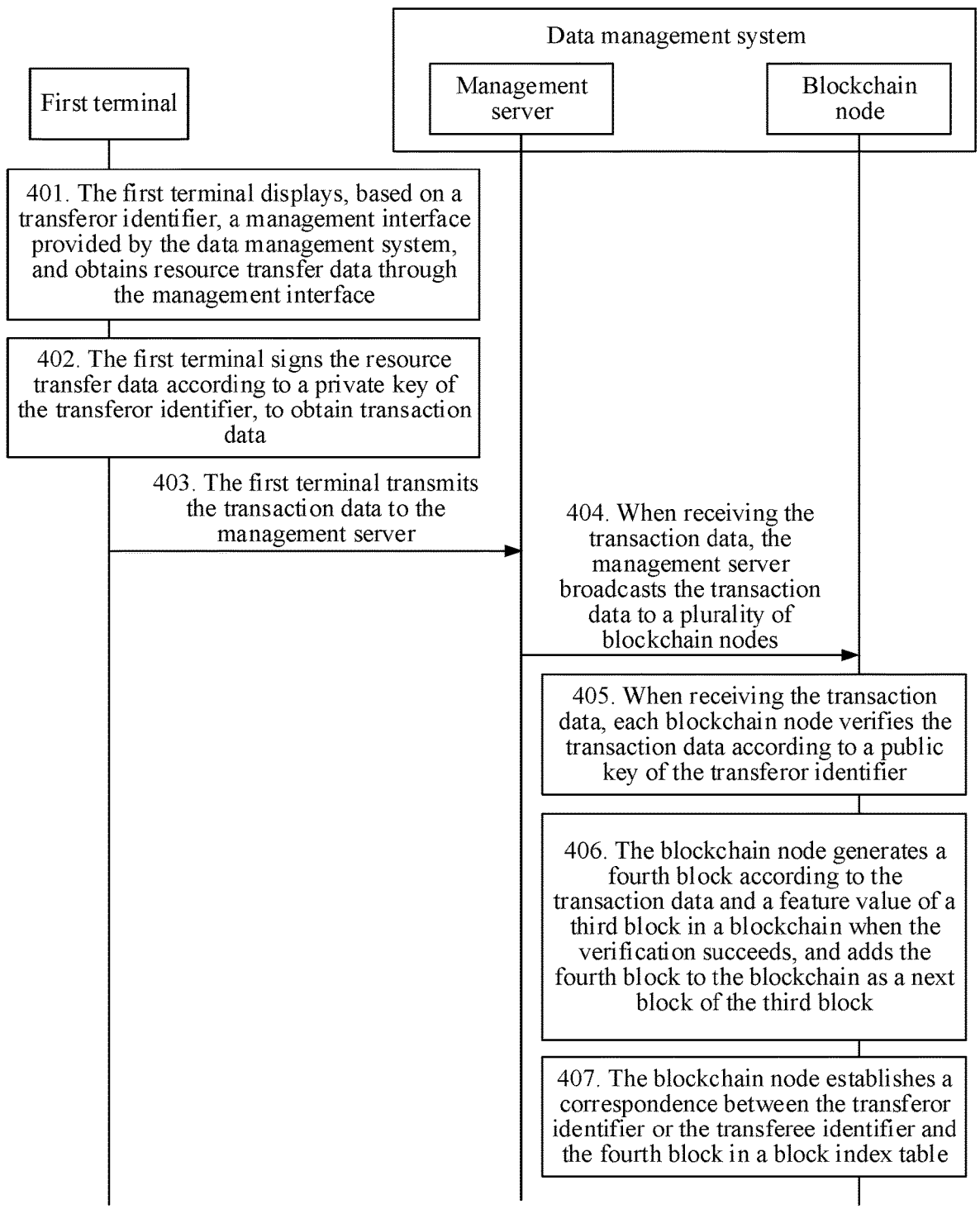
FIG. 4 is a schematic diagram of a resource transfer data management method according to an embodiment of this disclosure.

FIG. 4 is a schematic diagram of an exemplary data management method for resource transfer according to an embodiment of this disclosure. The execution main body of this embodiment of this disclosure may be a first terminal and a data management system. In this embodiment of this disclosure, the process of initiating resource transfer by the first terminal is described. Referring to FIG. 4, the method includes the following steps:

401. The first terminal displays, based on a transferor identifier, a management interface provided by the data management system, and obtains resource transfer data through the management interface.

In this embodiment of this disclosure, the first terminal may be a device such as a mobile phone, a computer, or a tablet computer. The first terminal logs in to the data management system based on a user identifier, and the user identifier is used for representing the user identity. In this embodiment of this disclosure, a user of the first terminal may be the transferor. When accessing the data management system, the first terminal displays the management interface provided by the data management system, and the transferor may trigger a management operation on the management interface.

The management operation may be an operation of initiating the resource transfer to transfer the resources to the transferee. In a possible implementation, the management interface includes a data setting bar/area and a transfer option. When the transferor sets a transferee identifier and a quantity of to-be-transferred resources in the data setting bar, and triggers the transfer option, the first terminal detects the operation of initiating the resource transfer, and obtains resource transfer data. The resource transfer data includes a transferor identifier, a transferee identifier, and a resource quantity.

402. The first terminal signs the resource transfer data according to a private key of the transferor identifier, to obtain transaction data. The private key is used for representing an identity of the transferor, and it may be determined, through tracing back according to the transaction data, that the resource transfer process is initiated by the transferor.

In this embodiment of this disclosure, a multi-private key scheme is used. For a resource account of the transferor, private keys may be allocated to both the transferor and the first server, which may transfer resources in the resource account by using their own private keys, and make signatures according to their own private keys during resource transfer. Therefore, it can be determined, according to the signature, whether the resource transfer process is initiated by the transferor or the first server.

403. The first terminal transmits the transaction data to the management server.
404. When receiving the transaction data, the management server broadcasts the transaction data to a plurality of blockchain nodes.
405. When receiving the transaction data, each blockchain node verifies the transaction data according to a public key of the transferor identifier.
406. The blockchain node generates a fourth block according to the transaction data and a feature value of a third block in a case that the verification succeeds, and adds the fourth block to a blockchain as a next block of the third block, the fourth block being used for storing the transaction data.
407. The blockchain node establishes a correspondence between the transferor identifier or the transferee identifier and the fourth block in a block index table, the block index table being used for querying a block corresponding to any transferor identifier or a block corresponding to any transferee identifier.

The foregoing steps 403 to 407 are similar to the foregoing steps 303 to 307, and details are not described herein again.

According to the method provided in this embodiment of this disclosure, in the process of transferring the resources, the transferor signs the resource transfer data according to the private key of the transferor, to obtain the transaction data, and stores the transaction data in the blockchain. Because the next block in the blockchain is generated according to the feature value of the previous block, and an association relationship exists between the adjacent blocks, the next block has a characteristic that the data may not be tampered with, and storing the transaction data in the blockchain may ensure the security of the resource transfer data, thereby preventing the resource transfer data from getting lost or tampered with, and facilitating subsequent management operations such as querying the resource transfer data through the blockchain. In addition, the identity of the transferor is represented by using the private key of the transferor, so that traceability of the transaction data is ensured.

Figure 5:
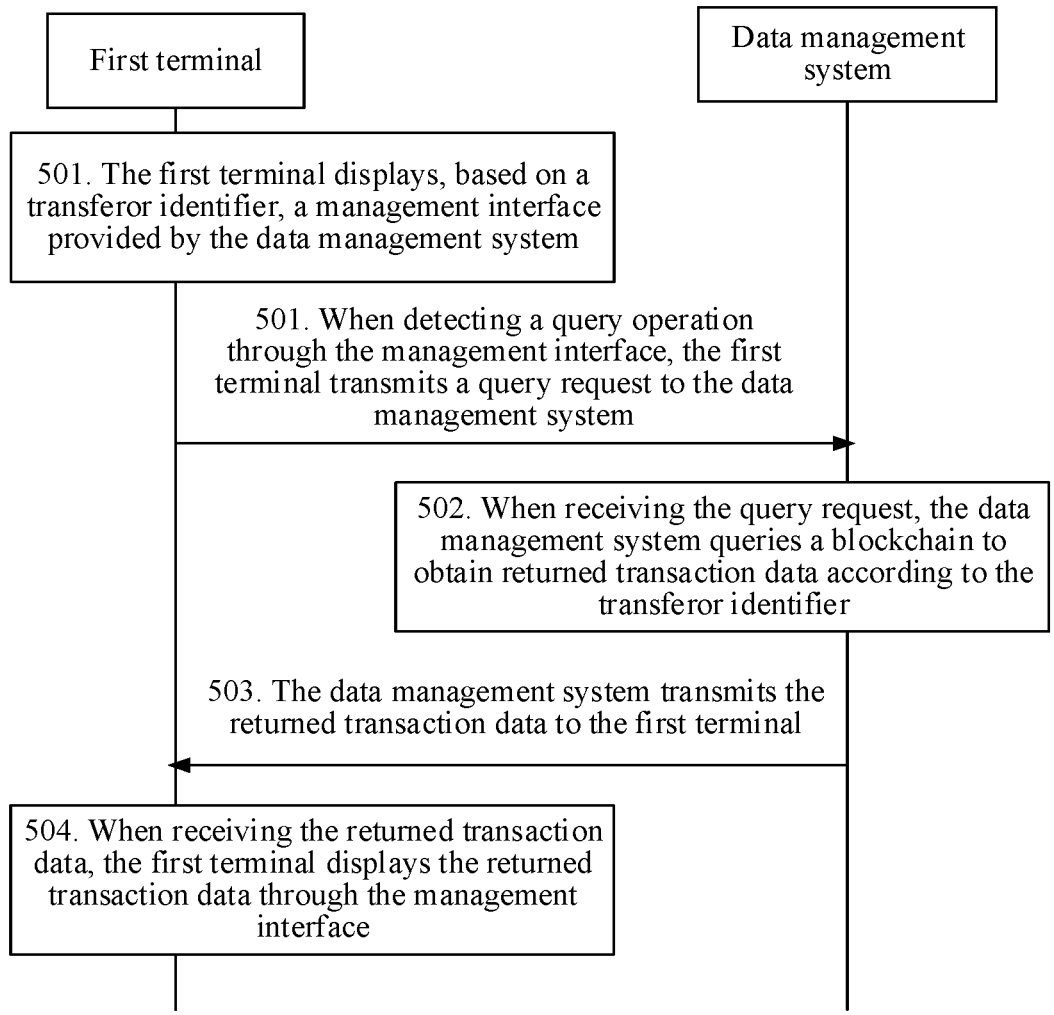
FIG. 5 is a schematic diagram of a resource transfer data management method according to an embodiment of this disclosure.

FIG. 5 is a schematic diagram of a resource transfer data management method according to an embodiment of this disclosure. The execution body of this embodiment of this disclosure is a first terminal and a data management system. In this embodiment of this disclosure, the process of querying transaction data by the first terminal is described. Referring to FIG. 5, the method includes the following steps:

501. The first terminal displays, based on a transferor identifier, a management interface provided by the data management system, and when detecting a query operation through the management interface, transmits a query request to the data management system, the query request carrying the transferor identifier of the first terminal.

In this embodiment of this disclosure, the first terminal may be a device such as a mobile phone, a computer, or a tablet computer. The first terminal logs in to the data management system based on a user identifier, and the user identifier is used for representing the user identity. In this embodiment of this disclosure, a user of the first terminal may be the transferor. When accessing the data management system, the first terminal displays the management interface provided by the data management system, and the transferor may trigger a management operation on the management interface.

The management operation may include a query operation. The query operation is used for instructing to query the resource transfer data of the transferor. In a possible implementation, the management interface includes a query condition setting bar and a query option. When the transferor sets a query condition in the query condition setting bar and triggers the query option, the first terminal detects the query operation, and transmits a query request to the data management system. The query request carries the transferor identifier and the query condition.

The query condition may include at least one of a resource transfer time period or a resource transfer type. The resource transfer time period is used for querying resource transfer data within the resource transfer time period. The resource transfer type includes two types: delegating transfer (i.e., passive transfer) and active transfer. The delegating transfer means that the intermediary perform the resource transfer on behalf of the transferor, and a specific process is similar to the foregoing embodiment shown in FIG. 3. The active transfer means that the transferor directly performs the resource transfer by using the data management system without the intermediary.

Certainly, the transferor may alternatively not set the query condition, and the query request transmitted by the first terminal to the data management system may not include the query condition, to request to query all transaction data of the transferor.

The foregoing step 501 is an optional step. In another embodiment, the first terminal may access the first server, and when detecting the query operation through an application interface provided by the first server, the first terminal transmits the query request to the first server, and the first server forwards the query request to the data management system.

502. When receiving the query request, the data management system queries, in the blockchain, transaction data including the transferor identifier.
503. The data management system transmits the returned transaction data via the query to the first terminal.

When transmitting the query request to the data management system, the first terminal may transmit the query request to one of blockchain nodes. When receiving the query request, the blockchain node queries, in the blockchain, the transaction data including the transferor identifier, and returns the transaction data to the first terminal.

In a possible implementation, when the data management system includes a management server, the first terminal transmits the query request to the management server, the management server transmits the query request to one of blockchain nodes, and the blockchain node queries transaction data, and then returns the acquired transaction data via the query to the first terminal through the management server.

Optionally, when querying, the blockchain node traverses each block in the blockchain, and determines whether resource transfer data stored in each block includes the transferor identifier, to find the transaction data including the transferor identifier. Alternatively, if the blockchain node has created a block index table, and stores, in the block index table, a correspondence between any transferor identifier and a block storing the resource transfer data, or a correspondence between any transferee identifier and a block storing the resource transfer data, the blockchain node may determine, according to the block index table, a block corresponding to the transferor identifier, and then obtains the transaction data including the transferor identifier from the block in the blockchain.

In another possible implementation, when the query request includes the query condition, after obtaining the transaction data including the transferor identifier from the block, the blockchain node further determines whether the transaction data meets the query condition, to determine the transaction data that meets the query condition, and transmits the transaction data to the first terminal.

For example, if the query condition includes the resource transfer time period, the blockchain node obtains a resource transfer time in the transaction data, and determines whether the resource transfer time belongs to the resource transfer time period, to determine transaction data of which the resource transfer time belongs to the resource transfer time period.

For example, if the query condition includes the resource transfer type, the blockchain node obtains signature data in the transaction data, and determines whether the signature data is signed according to a private key of the first server or a private key of the first terminal, to determine whether the resource transfer type is delegating transfer or active transfer and whether the query condition is met.

In another embodiment, when the data management system includes a management server, the management server may cache transaction data obtained in a previous time period. The management server may first query the transaction data including the transferor identifier in the cached transaction data when receiving the query request transmitted by the first terminal, returns the transaction data to the first terminal when the transaction data including the transferor identifier is found, and then queries the transaction data including the transferor identifier in the blockchain when the transaction data including the transferor identifier is not found.

504. When receiving the transaction data, the first terminal displays the transaction data through the management interface.

The transaction data includes resource transfer data and signature data. The first terminal may display the resource transfer data, to show a resource transfer information to the transferor, or may display the signature data, to show the resource transfer type to the transferor.

According to the method provided in this embodiment of this disclosure, the transaction data is stored in the blockchain, and a function of querying the transaction data is provided, to ensure that a user can query the transaction data, to learn of the resource transfer information and the user identity that initiates the resource transfer, so that the query operation is convenient and quick. In case the resources of the transferor are maliciously transferred to another resource account, accountability may be tracked according to a signature of the transaction data, to compensate for the resource loss of the transferor. In addition, the supervision department can effectively query and supervise the transaction data, so that the operation standardization is ensured, and any illegal behaviors may be caught in time.

Figure 6:
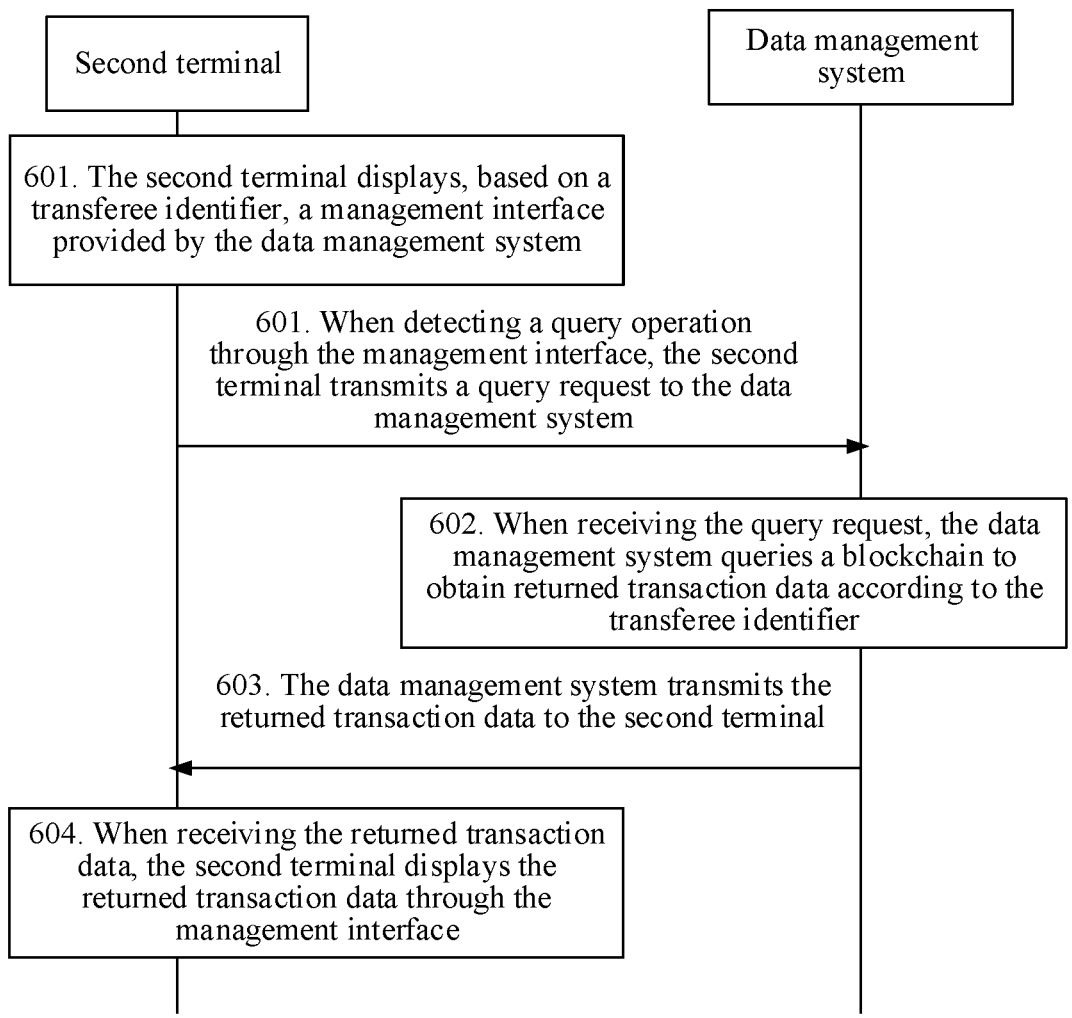
FIG. 6 is a schematic diagram of a resource transfer data management method according to an embodiment of this disclosure.

FIG. 6 is a schematic diagram of a resource transfer data management method according to an embodiment of this disclosure. The execution body of this embodiment of this disclosure is a second terminal and a data management system. In this embodiment of this disclosure, the process of querying transaction data by the second terminal is described. Referring to FIG. 6, the method includes the following steps:

601. The second terminal displays, based on a transferee identifier, a management interface provided by the data management system, and when detecting a query operation through the management interface, transmits a query request to the data management system, the query request carrying the transferee identifier of the second terminal.

In this embodiment of this disclosure, the second terminal may be a device such as a mobile phone, a computer, or a tablet computer. The second terminal logs in to the data management system based on a user identifier, and the user identifier is used for representing the user identity. In this embodiment of this disclosure, a user of the second terminal may be the transferee. When accessing the data management system, the second terminal displays the management interface provided by the data management system, and the transferee may trigger a management operation on the management interface.

The management operation may include a query operation. The query operation is used for instructing to query resource transfer data of the transferee. In a possible implementation, the management interface includes a query condition setting bar and a query option. When the transferee sets a query condition in the query condition setting bar and triggers the query option, the second terminal detects the query operation, and transmits a query request to the data management system. The query request carries the transferee identifier and the query condition.

The query condition may include a resource transfer time period, and the like. The resource transfer time period is used for querying resource transfer data within the resource transfer time period. Certainly, the transferee may alternatively not set the query condition, and the query request transmitted by the second terminal to the data management system may not include the query condition, to request to query all transaction data of the transferee.

The foregoing step 601 is an optional step. In another embodiment, the second terminal may access the first server, and when detecting the query operation through an application interface provided by the first server, transmits the query request to the first server, and the first server forwards the query request to the data management system.

602. When receiving the query request, the data management system queries, in the blockchain, transaction data including the transferee identifier.

603. The data management system transmits the found transaction data to the second terminal.

When transmitting the query request to the data management system, the second terminal may transmit the query request to one of blockchain nodes. When receiving the query request, the blockchain node queries, in the blockchain, the transaction data including the transferee identifier, and returns the transaction data to the second terminal.

In a possible implementation, when the data management system includes a management server, the second terminal transmits the query request to the management server, the management server transmits the query request to one of blockchain nodes, and the blockchain node queries transaction data, and then returns the returned transaction data to the second terminal through the management server.

Optionally, when querying, the blockchain node traverses each block in the blockchain, and determines whether resource transfer data stored in each block includes the transferee identifier, to find the transaction data including the transferee identifier. Alternatively, if the blockchain node has created a block index table, and stores, in the block index table, a correspondence between any transferee identifier and a block storing the resource transfer data, or a correspondence between any transferee identifier and a block storing the resource transfer data, the blockchain node may determine, according to the block index table, a block corresponding to the transferee identifier, and then obtains the transaction data including the transferee identifier from the block in the blockchain.

In another possible implementation, when the query request includes the query condition, after obtaining the transaction data including the transferee identifier from the block, the blockchain node further determines whether the transaction data meets the query condition, to determine the transaction data that meets the query condition, and transmits the transaction data to the second terminal.

For example, if the query condition includes the resource transfer time period, the blockchain node obtains a resource transfer time in the transaction data, and determines whether the resource transfer time belongs to the resource transfer time period, to determine transaction data of which the resource transfer time belongs to the resource transfer time period.

In another embodiment, when the data management system includes a management server, the management server may cache transaction data obtained in a previous time period. The management server may first query the transaction data including the transferee identifier in the cached transaction data when receiving the query request transmitted by the second terminal, returns the transaction data to the second terminal when the transaction data including the transferee identifier is found, and then queries the transaction data including the transferee identifier in the blockchain when the transaction data including the transferee identifier is not found.

604. When receiving the transaction data, the second terminal displays the transaction data through the management interface.

The transaction data includes resource transfer data and signature data. The second terminal may display the resource transfer data, to show a resource transfer information to the transferee, or may display the signature data, to show the resource transfer type to the transferee.

According to the method provided in this embodiment of this disclosure, the transaction data is stored in the blockchain, and a function of querying the transaction data is provided, to ensure that a user can query the transaction data, to learn of the resource transfer information and the user identity that initiates the resource transfer, so that the query operation is convenient and quick. In case the resources of the transferor are maliciously transferred to another resource account, accountability may be tracked according to a signature of the transaction data, to compensate for the resource loss of the transferor. In addition, the supervision department can effectively query and supervise the transaction data, so that the operation standardization is ensured, and any illegal behaviors can be found in time.

In the foregoing embodiments shown in FIG. 5 and FIG. 6, descriptions are made by using the process of querying transaction data by the transferor or the transferee. Alternatively, the intermediary or the supervision department may also query the transaction data.

In a possible implementation, a terminal configured for the intermediary may transmit a query request to the first server, and the first server forwards the query request to the data management system. The query request carries any user identifier, and is used for querying transaction data corresponding to the user identifier. Alternatively, a terminal configured for the supervision department may transmit a query request to the data management system. The query request carries any user identifier, and is used for querying transaction data corresponding to the user identifier. A specific process of querying transaction data is similar to the foregoing embodiments shown in FIG. 5 and FIG. 6. Details are not described herein again.

Figure 7:
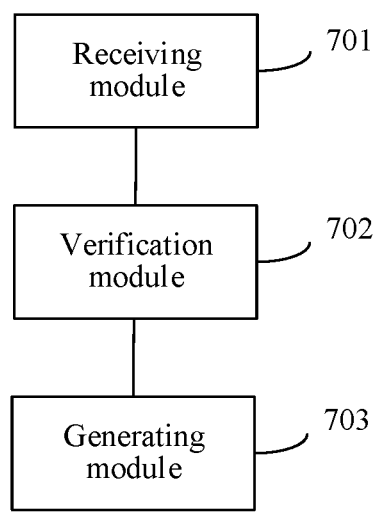
FIG. 7 is a schematic structural diagram of a resource transfer data management apparatus according to an embodiment of this disclosure.

FIG. 7 is a schematic structural diagram of a resource transfer data management apparatus according to an embodiment of this disclosure. Referring to FIG. 7, the apparatus is applied to a data management system. The data management system includes a plurality of blockchain nodes, and the apparatus includes:

- a receiving module 701, configured to perform the operation of receiving transaction data transmitted by a first server in the foregoing embodiments;
- a verification module 702, configured to perform the operation of verifying the transaction data according to a public key of the first server in the foregoing embodiments; and
- a generating module 703, configured to perform the operation of generating a second block according to the transaction data and a feature value of a first block in a blockchain if the verification succeeds, and adding the second block to the blockchain in the foregoing embodiments.

Optionally, the transaction data includes the resource transfer data and signature data. The signature data is obtained by signing a feature value of the resource transfer data according to the private key of the first server. The verification module 702 includes:

- a feature value obtaining unit, configured to perform the operation of obtaining the feature value of the resource transfer data in the foregoing embodiments;
- a decryption unit, configured to perform the operation of decrypting the signature data according to the public key of the first server, to obtain a decrypted feature value in the foregoing embodiments; and
- a verification unit, configured to perform the operation of determining that the verification on the transaction data succeeds if the decrypted feature value matches the feature value of the resource transfer data in the foregoing embodiments.

Optionally, the generating module 703 includes:

- a generating unit, configured to perform the operation of generating the second block according to the transaction data and the feature value of the first block if at least one of the plurality of blockchain nodes verifies that the transaction data meets a smart contract, and adding the second block to the blockchain in the foregoing embodiments.

Optionally, the apparatus further includes:

- an establishment module, configured to perform the operation of establishing a correspondence between at least one of the transferor identifier or the transferee identifier and the second block in a block index table in the foregoing embodiments.

Optionally, the apparatus further includes:

a receiving module, configured to perform the operation of receiving a query request transmitted by a first terminal in the foregoing embodiments;

a query module, configured to perform the operation of querying, in the blockchain, transaction data including the transferor identifier in the foregoing embodiments; and a transmitting module, configured to perform the operation of transmitting the returned transaction data via the query to the first terminal in the foregoing embodiments.

Optionally, the query module includes:

a block query module, configured to perform the operation of querying, according to a block index table, a block corresponding to the transferor identifier in the foregoing embodiments; and an obtaining unit, configured to perform the operation of obtaining, from the block of the blockchain, the transaction data including the transferor identifier.

Optionally, the apparatus further includes:

a receiving module, configured to perform the operation of receiving a query request transmitted by a second terminal in the foregoing embodiments;

a query module, configured to perform the operation of querying, in the blockchain, transaction data including the transferee identifier in the foregoing embodiments; and a transmitting module, configured to perform the operation of transmitting the returned transaction data via the query to the second terminal in the foregoing embodiments.

Optionally, the query module includes:

a block query module, configured to perform the operation of querying, according to a block index table, a block corresponding to the transferee identifier in the foregoing embodiments; and an obtaining unit, configured to perform the operation of obtaining, from the block of the blockchain, the transaction data including the transferee identifier.

Figure 8:
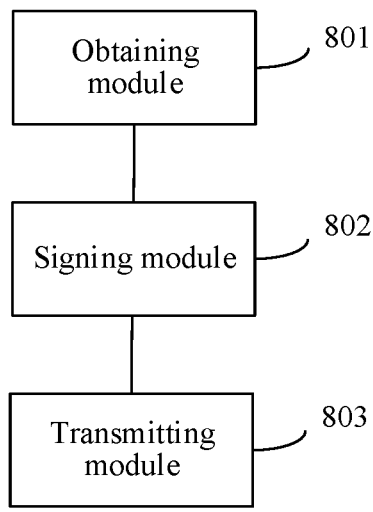
FIG. 8 is a schematic structural diagram of a resource transfer data management apparatus according to an embodiment of this disclosure.

FIG. 8 is a schematic structural diagram of a resource transfer data management apparatus according to an embodiment of this disclosure. Referring to FIG. 8, the apparatus is applied to a first server and includes:

an obtaining module 801, configured to perform the operation of obtaining resource transfer data in the foregoing embodiments;

a signing module 802, configured to perform the operation of signing the resource transfer data according to a private key of the first server in response to determining that the resource transfer data meets a delegating resource transfer condition in the foregoing embodiments, to obtain transaction data;

a transmitting module 803, configured to perform the operation of transmitting the transaction data to the data management system in the foregoing embodiments; and the data management system including a plurality of blockchain nodes, and the data management system being configured to: verify the transaction data according to a public key of the first server, generate a second block according to the transaction data and a feature value of a first block in a blockchain if the verification succeeds, and add the second block to the blockchain as a next block of the first block, the second block being used for storing the transaction data.

Optionally, the apparatus further includes:

a determining module, configured to perform at least one of the following:

the delegating resource transfer condition including a specified transferor identifier of which a delegating resource transfer function is activated, and determining, if the transferor identifier is the specified transferor identifier, that the resource transfer data meets the delegating resource transfer condition;

the delegating resource transfer condition including a correspondence between the specified transferor identifier of which the delegating resource transfer function is activated and a specified transferee identifier, and determining, if the delegating resource transfer condition includes the correspondence between the transferor identifier and the transferee identifier, that the resource transfer data meets the delegating resource transfer condition; and the delegating resource transfer condition including a maximum quantity of resources allowed to be transferred, and determining, if the resource quantity is not greater than the maximum quantity of resources allowed to be transferred, that the resource transfer data meets the delegating resource transfer condition.

Optionally, the signing module 802 includes:

a feature value obtaining unit, configured to perform the operation of obtaining the feature value of the resource transfer data in the foregoing embodiments; and a signing module, configured to perform the operation of signing the feature value of the resource transfer data according to the private key of the first server in the foregoing embodiments, to obtain signature data.

When the resource transfer data management apparatus provided in the foregoing embodiments manages the resource transfer data, division of the foregoing functional modules is only described for exemplary purposes. During actual application, the foregoing functions may be allocated to be accomplished by different functional modules according to requirements, that is, the internal structure of the apparatus is divided into different functional modules, to implement all or some of the functions described above. In addition, the resource transfer data management apparatus provided in the foregoing embodiments belongs to the same concept as the resource transfer data management method embodiments. For a specific implementation process, refer to the method embodiments. Details are not described herein again.

Figure 9:
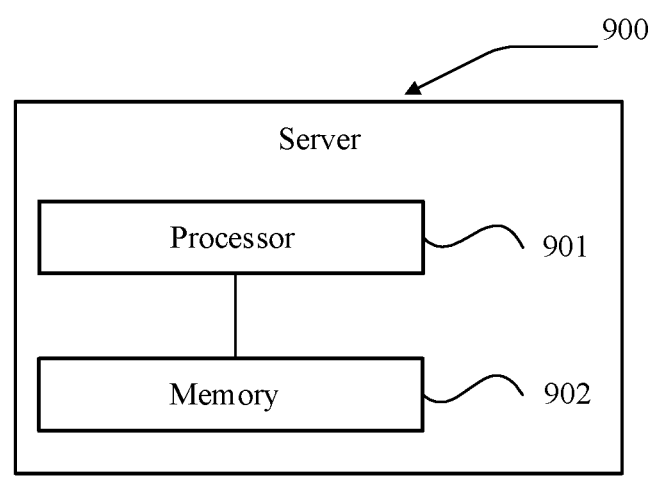
FIG. 9 is a schematic structural diagram of a server according to an embodiment of this disclosure.

FIG. 9 is a schematic structural diagram of a server according to an embodiment of this disclosure. The server 900 may vary greatly due to different configurations or performance, and may include one or more central processing units (CPUs) 901 and one or more memories 902. The memory 902 stores at least one instruction, the at least one instruction being loaded and executed by the processor 901 to implement the methods provided in the foregoing method embodiments. Certainly, the server may further include components such as a wired or wireless network interface, a keyboard, and an input/output interface, to facilitate input/output. The server may further include another component configured to implement functions of a device, and details are not described herein again.

The server 900 may be configured to perform the steps performed by the data management system or the first server in the foregoing resource transfer data management method.

An embodiment of this disclosure further provides a resource transfer data management apparatus. The resource transfer data management apparatus includes a processor and a memory. The memory stores at least one instruction, at least one program, a code set, or an instruction set. The instruction, the program, the code set, or the instruction set is loaded by the processor and has operations to implement the resource transfer data management method in the foregoing embodiments.

An embodiment of this disclosure further provides a non-transitory computer-readable storage medium. The non-transitory computer-readable storage medium stores at least one instruction, at least one program, a code set, or an instruction set. The instruction, the program, the code set, or the instruction set is loaded by a processor and has operations to implement the resource transfer data management method in the foregoing embodiments.

The steps of the embodiments of this disclosure are not necessarily performed according to a sequence indicated by step numbers. Unless explicitly specified in this application, the sequence for performing the steps is not strictly limited, and the steps may be performed in other sequences. Moreover, at least some of the steps in the embodiments may include a plurality of sub-steps or a plurality of stages. The sub-steps or stages are not necessarily performed at the same moment but may be performed at different moments. The sub-steps or stages are not necessarily performed sequentially, but may be performed in turn or alternately with other steps or at least some sub-steps or stages of other steps.

A person of ordinary skill in the art may understand that all or some of the processes in the method of the foregoing embodiments may be implemented and completed by using the computer programs to instruct related hardware. The programs may be stored in a non-transitory computer-readable storage medium, and the programs, when executed, may include the processes of the foregoing method embodiments. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The foregoing descriptions are merely exemplary embodiments of the embodiments of this disclosure, but are not intended to limit the embodiments of this disclosure. Any modification, equivalent replacement, or improvement made within the spirit and principle of the embodiments of this disclosure shall fall within the protection scope of this application.

What is claimed is:

1. A method for resource transfer data management, performed by a data management system, the method comprising:
   receiving, by a management server from a first server, transaction data that is obtained by the first server by signing resource transfer data according to a private key of the first server, the resource transfer data comprising a transferor identifier, a transferee identifier, and a quantity of resources to be transferred from a transferor to a transferee;
   determining, by the management server based on a first smart contract, a plurality of blockchain nodes of a blockchain in the data management system as target nodes for verifying and adding blocks associated with the transaction data;
   broadcasting, by the management server to the plurality of blockchain nodes, the transaction data; and
   for each of the plurality of blockchain nodes:
      generating a second smart contract specifying conditions that the transaction data needs to be met, the conditions comprising at least one of:
         whether a format of the transaction data is legal;
         whether mandatory information presents in the transaction data;
         whether a user initiating the transaction data has a permission; or
         a minimum quantity of blockchain nodes required to succeed in verifying the transaction data;
      verifying the transaction data according to a public key of the first server and the second smart contract;
      generating node signature data in response to signing the verification result according to a private key of the each of the plurality of blockchain nodes;
      transmitting the node signature data to a designated blockchain node in the data management system; and
      in response to receiving an approval from the designated blockchain node, the approval being obtained after the designated blockchain node verifies all node signature data from the plurality of blockchain nodes based on the second smart contract, generating a second block according to the transaction data and a feature value of a first block in the each of the plurality of blockchain nodes, and adding the second block to the each of the plurality of blockchain nodes as a next block of the first block, the second block being used for storing the transaction data.

2. The method according to claim 1, wherein the transaction data comprises the resource transfer data and signature data, the signature data is obtained by signing a feature value of the resource transfer data according to the private key of the first server, and wherein verifying the transaction data according to the public key of the first server comprises:
   obtaining the feature value of the resource transfer data;
   decrypting the signature data according to the public key of the first server, to obtain a decrypted feature value; and
   determining that the verification on the transaction data succeeds in response to the decrypted feature value matching the feature value of the resource transfer data.

3. The method according to claim 1, wherein generating the second block, and adding the second block to the blockchain comprises:
   in response to the each of the plurality of blockchain nodes verifying that the transaction data meets the second smart contract, generating the second block according to the transaction data and the feature value of the first block, and adding the second block to the blockchain.

4. The method according to claim 1, wherein after generating the second block, and adding the second block to the blockchain, the method further comprises:
   establishing at least one of a correspondence between the transferor identifier and the second block or a correspondence between the transferee identifier and the second block in a block index table, the block index table being used for querying at least one of a block corresponding to the transferor identifier or a block corresponding to the transferee identifier.

5. The method according to claim 1, further comprising the management server performing:
receiving a query request transmitted by a first terminal, the query request carrying the transferor identifier;
querying the blockchain to obtain returned transaction data according to the transferor identifier; and
transmitting the returned transaction data to the first terminal.

6. The method according to claim 5, wherein querying the blockchain to obtain the returned transaction data according to the transferor identifier comprises:
querying, according to a block index table, a block corresponding to the transferor identifier, the block index table comprising the block corresponding to the transferor identifier; and
obtaining, from the block of the blockchain, the returned transaction data comprising the transferor identifier.

7. The method according to claim 1, further comprising the management server performing:
receiving a query request transmitted by a second terminal, the query request carrying the transferee identifier;
querying the blockchain to obtain returned transaction data according to the transferee identifier; and
transmitting the returned transaction data to the second terminal.

8. The method according to claim 7, wherein querying the blockchain, to obtain the returned transaction data according to the transferee identifier comprises:
querying, according to a block index table, a block corresponding to the transferee identifier, the block index table comprising the block corresponding to the transferee identifier; and
obtaining, from the block of the blockchain, the returned transaction data comprising the transferee identifier.

9. A data management system for resource transfer data management, comprising a management server; and a plurality of blockchain nodes on a blockchain, the management server further comprising at least one processor, and a memory storing computer instructions, the computer instructions, when executed by the at least one processor, cause the management server to:
receive, by the management server from a first server, transaction data that is obtained by the first server by signing resource transfer data according to a private key of the first server, the resource transfer data comprising a transferor identifier, a transferee identifier, and a quantity of resources to be transferred from a transferor to a transferee;
determine, by the management server based on a first smart contract, the plurality of blockchain nodes of a blockchain in the data management system as target nodes for verifying and adding blocks associated with the transaction data;
broadcast, by the management server to the plurality of blockchain nodes, the transaction data; and
each of the plurality of blockchain nodes further comprising at least one secondary processor, and a secondary memory storing secondary computer instructions, the secondary computer instructions, when executed by the at least one secondary processor, cause the each of the plurality of blockchain nodes to:
generate a second smart contract specifying conditions that the transaction data needs to be met, the conditions comprising at least one of:
whether a format of the transaction data is legal;
whether mandatory information presents in the transaction data;
whether a user initiating the transaction data has a permission; or
a minimum quantity of blockchain nodes required to succeed in verifying the transaction data;
verify the transaction data according to a public key of the first server and the second smart contract;
generate node signature data in response to signing the verification result according to a private key of the each of the plurality of blockchain nodes;
transmit the node signature data to a designated blockchain node in the data management system; and
in response to receive an approval from the designated blockchain node, the approval being obtained after the designated blockchain node verifies all node signature data from the plurality of blockchain nodes based on the second smart contract, generate a second block according to the transaction data and a feature value of a first block in the each of the plurality of blockchain nodes, and add the second block to the each of the plurality of blockchain nodes as a next block of the first block, the second block being used for storing the transaction data.

10. The data management system according to claim 9, wherein the transaction data comprises the resource transfer data and signature data, the signature data is obtained by signing a feature value of the resource transfer data according to the private key of the first server, and wherein, when the secondary computer instructions cause the each of the plurality of blockchain nodes to verify the transaction data according to the public key of the first server, the secondary computer instructions cause the each of the plurality of blockchain nodes to:
obtain the feature value of the resource transfer data;
decrypt the signature data according to the public key of the first server, to obtain a decrypted feature value; and
determine that the verification on the transaction data succeeds in response to the decrypted feature value matching the feature value of the resource transfer data.

11. The data management system according to claim 9, wherein, when the secondary computer instructions cause the each of the plurality of blockchain nodes to generate the second block according to the transaction data and the feature value of the first block in the blockchain, and add the second block to the blockchain, the secondary computer instructions cause the each of the plurality of blockchain nodes to:
in response to the each of the plurality of blockchain nodes verifying that the transaction data meets the second smart contract, generate the second block according to the transaction data and the feature value of the first block.

12. The data management system according to claim 9, wherein, after the secondary computer instructions cause the each of the plurality of blockchain nodes to generate the second block, and add the second block to the blockchain, the secondary computer instructions further cause the each of the plurality of blockchain nodes to:
establish at least one of a correspondence between the transferor identifier and the second block or a correspondence between the transferee identifier and the second block in a block index table, the block index table being used for querying at least one of a block corresponding to the transferor identifier or a block corresponding to the transferee identifier.

13. The data management system according to claim 9, wherein, when the at least one processor executes the computer instructions, the computer instructions further cause the management server to:
   receive a query request transmitted by a first terminal, the query request carrying the transferor identifier;
   query the blockchain to obtain returned transaction data according to the transferor identifier; and
   transmit the returned transaction data to the first terminal.

14. The data management system according to claim 13, wherein, when the computer instructions cause the management server to query the blockchain to obtain the returned transaction data according to the transferor identifier, the computer instructions cause the management server to:
   query, according to a block index table, a block corresponding to the transferor identifier, the block index table comprising the block corresponding to the transferor identifier; and
   obtain, from the block of the blockchain, the returned transaction data comprising the transferor identifier.

15. The data management system according to claim 9, wherein, when the at least one processor executes the computer instructions, the computer instructions further cause the management server to:
   receive a query request transmitted by a second terminal, the query request carrying the transferee identifier;
   query the blockchain to obtain returned transaction data according to the transferee identifier; and
   transmit the returned transaction data to the second terminal.

16. The data management system according to claim 15, wherein, when the computer instructions cause the management server to query the blockchain, to obtain the returned transaction data according to the transferee identifier, the computer instructions cause the management server to:
   query, according to a block index table, a block corresponding to the transferee identifier, the block index table comprising the block corresponding to the transferee identifier; and
   obtain, from the block of the blockchain, the returned transaction data comprising the transferee identifier.

* * * * *